Figure 6:
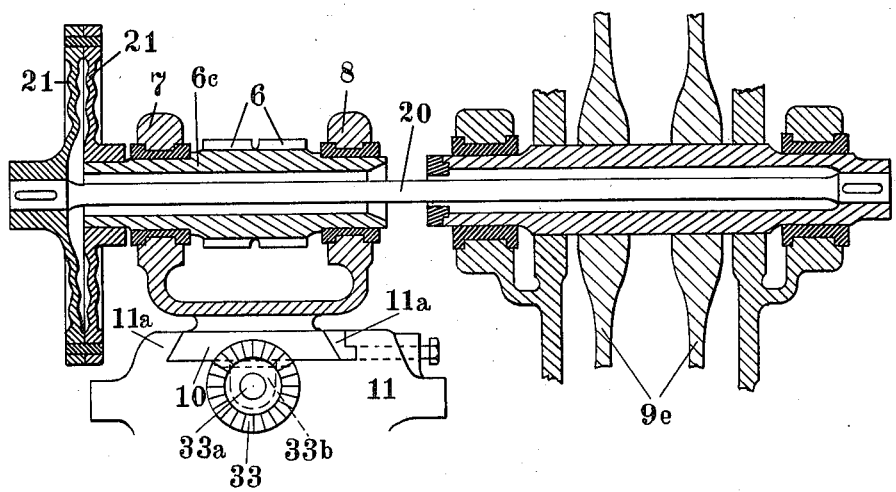

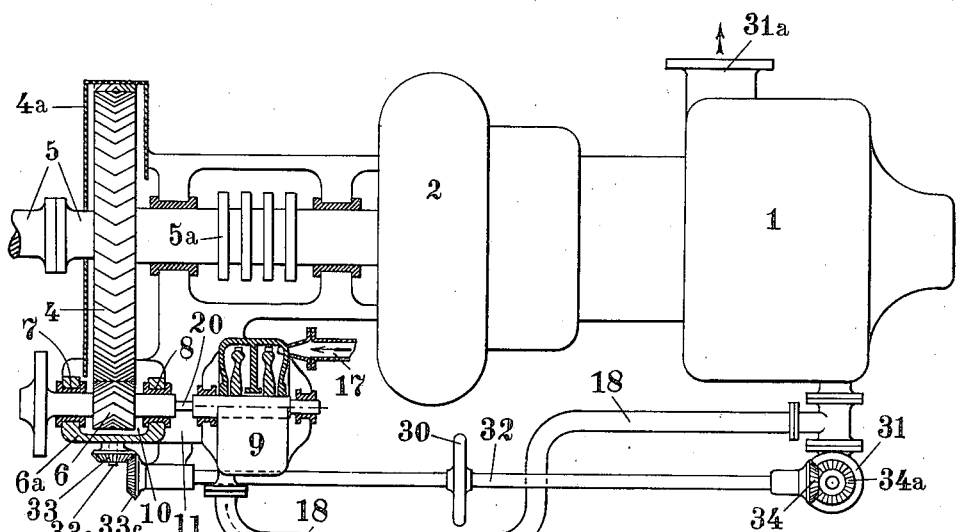

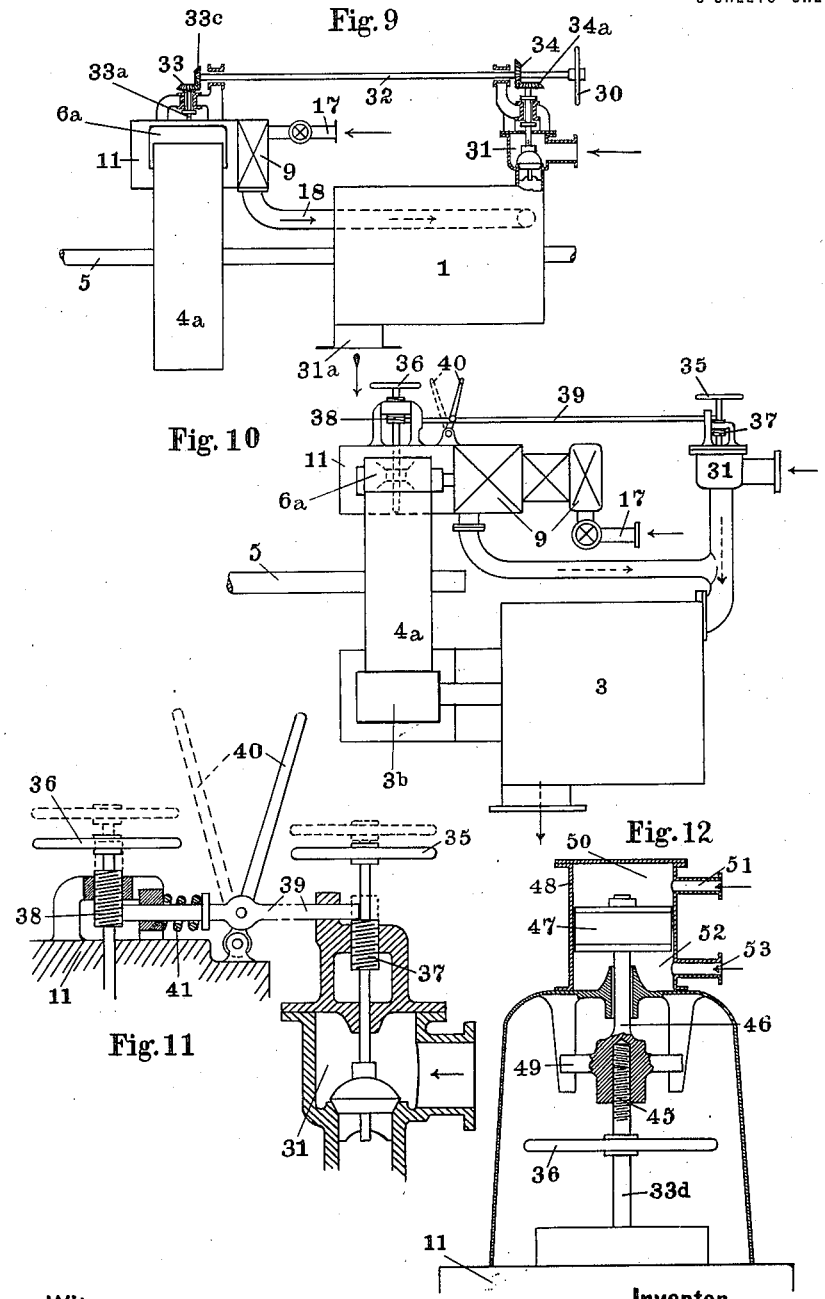

UNITED STATES PATENT OFFICE.

HERMANN FÖTTINGER, OF ZOPPOT, NEAR DANZIG, GERMANY.

STEAM-TURBINE PLANT FOR SHIPS.

1,296,378. Specification of Letters Patent. Patented Mar. 4, 1919.

Application filed June 10, 1914. Serial No. 844,192.

*To all whom it may concern:*

Be it known that I, HERMANN FÖTTINGER, a subject of the King of Bavaria, residing at No. 13 Baedeckerweg, Zoppot, near Danzig, in Germany, have invented new and useful Improvements in Steam-Turbine Plants for Ships, of which the following is a specification.

This invention relates to steam-turbine plants for ships, especially warships, comprising a high-pressure cruising turbine and a low-pressure main turbine of suitable construction, which turbines are connected in series so that for small speeds of way, the steam may pass from the cruising turbine into the main turbine, while when going at full speed, only the main turbines are fed with steam. In such power plants it is preferable to adapt the cruising turbines, to rotate at a higher speed than the main turbines, in order to attain the maximum efficiency of the sets of turbines, and to this end the cruising- and main-turbines are connected the one with the other by an intermediate gearing consisting of toothed gear wheels with a convenient ratio of transmission corresponding to their respective speeds of rotation. From this connection losses will arise, when the cruising turbine is running idle and rotated by the main turbine. It has, therefore, been proposed to disconnect the cruising turbines when not working.

The usual solution, of this problem is to provide detachable clutches on the pinion shaft or large gear wheel shaft or on the propeller shaft. Such clutches, however, are objectionable especially at high speeds and with varying directions of rotation of the turbine shaft, and on account of their weight, the amount of space which they take up, their price and general unreliability.

The object of the invention is to completely avoid these drawbacks by making the pinion with its bearings displaceable through the height of a gear tooth in a radial or approximately radial direction, upon a suitable guide so that it can be removed out of engagement with the large gear wheel. On account of the general and advantageous use of double helical teeth in the gearing the disengagement in an approximately radial direction according to the present invention is a most successful and satisfactory solution, as a displacement in this direction can be readily effected owing to the very small height of the teeth required in gearings for cruising turbines. At full speed of the ship the large wheel rotates unloaded, as it is disengaged from the pinion, while the latter with the cruising turbine is at a standstill. At cruising speed, the pinion is engaged with the gear wheel by being displaced toward the latter through the height of a tooth, which movement can be effected easily and surely owing to the small height of the gear teeth.

Another object of the invention is to provide an adjustable connection of the pinion with the cruising turbine in such a manner that the displacement of the former is possible, although the latter is stationary. Furthermore means may be provided whereby the cruising turbine can be displaced with the pinion.

A further object of the invention is the provision of controlling means between the gearing and the steam-turbines which allow the displacement of the pinion in a certain direction only when the corresponding steam-turbines are operated.

In the accompanying drawings which form a part of this specification, several constructions embodying the invention are diagrammatically illustrated by way of example. In the drawings—

Figure 1 represents a plan view of a turbine power plant with the disengaging gearing, partly in horizontal section, Fig. 2 a modification of the appliance for displacing the pinion.

Figure 7:
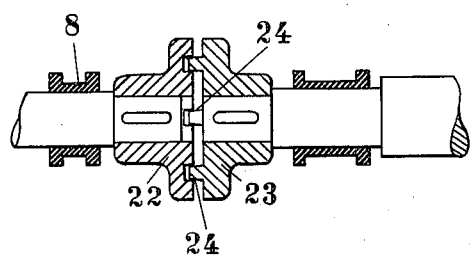
Figure 8:
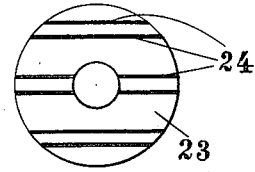

Fig. 3 the displaceable arrangement of the cruising turbine,

Fig. 4 a guide for the pinion, oscillating about a pivot,

Fig. 5 a further modification of the means for displacing the pinion,

Fig. 6 a longitudinal vertical section of the bearings and connecting means between the pinion and the cruising turbine shown in Fig. 1, on a larger scale, Figs. 7 and 8 respectively a sectional elevation and an end-view of an adjustable coupling device, Fig. 9 a sectional view of the controlling means, shown in Fig. 1, Fig. 10 a modification of the controlling means, Fig. 11 a sectional elevation of the operative parts of the device shown in Fig. 10, on a larger scale, and Fig. 12 a further modification of the controlling means.

Similar reference characters denote similar parts throughout all figures of the drawings.

Referring to Fig. 1 which shows the general arrangement of the power plant, 1 designates the main turbine, 2 an intermediate gearing of the hydraulic or any other type, 5 the propeller shaft with the thrust bearing 5ª, 4 the gear wheel and 6 the pinion of the intermediate gearing by which the cruising turbine 9 can be positively connected to the propeller shaft 5. The intermediate gearing 2 serves the purpose of transmitting the power of the main turbine 1 to the propeller shaft 5 with a lower speed, but it may be dispensed with and the main turbine be placed directly upon the propeller shaft, where this reduction is not desired. The gear wheels 4 and 6 may be inclosed in suitable sheet iron casings 4ª and 6ª, as illustrated in Figs. 1, 9 and 10, and the pinion 6 may be inclosed in a casing 6ᵇ formed on the bearing body around the pinion 6 between the bearings 7 and 8.

The main and cruising turbines may be of any preferred type and construction and provided with separate or interconnected steam supply and exhaust pipes, as represented in Figs. 1 and 9 with respect to the main turbine at 31 and 31ª and to the cruising turbine at 17 and 18 respectively, the piping 18 connecting the exhaust of the cruising turbine to the admission port of the main turbine.

The subject matter of the invention consists in the radial displacement of the pinion for throwing the cruising turbine into and out of gear with the drive shaft of the propeller, in combination with a reliable means for guiding the said pinion in such a manner that its true operation is insured in all positions. As the use of helical teeth on the gear wheels necessitates a very accurate contact, it is necessary to guide the pinion into engagement with the large gear wheel in as accurate a manner as possible. This guiding may be effected either rectilinearly or curvilinearly.

A rectilinear guiding of the pinion with its bearings and eventually with other parts connected therewith, is best attained by means of a slide movable on guides, similar to those used in machine-tools. Figs. 1, 2, 3, 5 and 6 illustrate details of the displacement device in the case of a rectilinearly movable supporting guide in several constructions; in all these figures, 10 is a slide which carries the bearings 7 and 8 of the pinion 6. The slide 10 is of prismatic form and is movable to and fro between lateral rails or guides 11ª of well known construction formed on the base 11. The pinion is journaled upon the slide at a suitable height, so that its axis is practically movable in a plane in which the axis of the gear wheel 4 is located.

In the construction shown in Fig. 1 the slide 10 is displaced by means of a screw-spindle 33ª rotatably arranged in the block 11, but prevented from axial displacement by usual means; the said spindle is in engagement with a nut 33ᵇ (Fig. 6) attached to the slide 10; as easily understood, these means will cause the slide 10 to move between the guides 11 and 11ª when the spindle 33ª is rotated. This rotation may be effected in different ways; for example a hand-wheel may be fixed on the spindle 33ª. Fig. 1 shows a bevel gear system 33 and 33ᶜ for the purpose of positively adjusting the slide 10 in connection with other parts, as will more fully be described hereinafter.

If the cruising turbine 9 is stationary, as illustrated in Fig. 1, a resilient connection between the same and the pinion 6 should be provided, in order to allow the pinion to be displaced alone. Such means will be ascertained later on. However, the cruising turbine 9 may be rigidly attached to the slide 10 and take part in the rocking movement of the pinion. This combination which is represented in Figs. 3 and 4, of course, necessitates a certain flexibility of the steam supply pipe 17ª and exhaust pipe 18ª. The said pipes are preferably yielding constructed in known manner with stuffing-boxes, membranes and the like.

Other means, such as levers, cams, racks or the like, can be provided for moving the slide 10; Figs. 2 and 5 respectively represent in an end view and longitudinal sectional elevation an example thereof. In this modification a shaft 14ª is journaled in the base 11 vertically to the direction of movement of the slide, an arm 14 and a hand lever 14ᵇ being attached thereto. The free extremity of the arm 14 projects into a recess between two bosses 14ᶜ formed underneath the slide 10. By oscillating the lever 14ᵇ the slide can be shifted in the desired direction.

In Fig. 5 stops 12 and 13 are also shown which limit the displacement of the slide 10, so as to procure an accurate adjustment of the pinion 6 with respect to the wheel 4. These stops or their equivalents can be applied to all other modifications.

A curvilinear guiding, for instance, circular, can be effected by means of circular guides 16 or by means of a pivot 15 or a combination of these means (Fig. 4). This pivot is preferably located beneath or in the vicinity of the cruising turbine 9 oscillating with the pinion, in order that, in this case, its movements should occasion only quite small variations in the direction of its steam supply and exhaust pipes 17ª and 18ª (Fig. 4).

Instead of the supporting guides 10, 15 or 16 other arrangements may be used for effecting an approximately radial displacement; for instance, the bearings of the pinion may be oscillated about an axis located eccentrically relatively to the axis of the pivot.

In the case where the cruising turbine is stationary (Figs. 1 and 2) a suitable flexible connection must be provided between the former and the pinion. In Fig. 6 such an arrangement which can be adapted to both the rectilinear and curvilinear disengaging devices is shown; for instance, an elastic shaft 20 is used which, by way of example, may traverse the hollow hub 6ᶜ of the pinion 6 and be connected thereto by any kind of flexible clutch, which allows an oblique adjustment in the inoperative position of the gearing, such as membrances 21 or the like, located between the hub 6ᶜ and the shaft 20, while the other end of the latter is wedged to the rotor of the cruising turbine 9ᵉ.

In place of this flexible connection, a slidable clutch (Figs. 7 and 8) can be provided which permits, at a predetermined angular position of the pinion shaft, of the displacement of one clutch part 22 (on the pinion side) relatively to the other part 23 (on the cruising turbine side) in radial direction without causing complete disengagement of the parts. This, for instance, may be effected in the simplest manner by providing a claw clutch with rectilinear parallel contact faces 24.

In some cases, when the cruising turbine is of a small size, the latter's rotor may be mounted simply upon the pinion shaft and, under certain conditions overhanging, that is to say outside the bearing 8, as illustrated in Fig. 3, whereby the displacement of the pinion and of the cruising turbine can be effected in a particularly easy manner.

The displacement devices may be also combined or blocked by reciprocal interlocking with the steam controlling valves of the turbines in such a manner that on or before opening the steam supply for full speed, the pinion with its cruising turbine is always disengaged, in order to avoid automatically rotation of the cruising turbine when the main turbine is running. Figs. 9-12 illustrate diagrammatically some constructions in which the device for displacing the pinion is connected with and dependent upon the steam control devices of the main or cruising turbines.

In the construction illustrated in Fig. 9, which is a similar, but inverse representation of Fig. 1, the hand wheel 30 of the steam inlet valve 31 of the steam turbine 1, is connected positively through the medium of a shaft 32 with the appliance for disengaging the pinion of the cruising turbine 9. The gearings 33 and 33ᶜ and 34 and 34ª respectively can be arranged in such a manner that the cruising turbine is disengaged before the valve 31 is opened.

Fig. 10 is an assembly and Fig. 11ª detail of a device to prevent opening of the main turbine steam inlet without disengaging the pinion, and vice versa, which can be actuated by the hand wheels 35 and 36 and the screw-threaded spindles 37 and 38, respectively. Between the valve 31 and the displacing appliance a rod or bolt 39 is provided which by means of a hand lever 40 and of a spring 41 can be displaced longitudinally. The bolt is of such a length that one of its ends is located before the end of the spindle 37 or 38 respectively, when its other end is located opposite the periphery of the other spindle, which for this reason is free to be screwed inwardly or outwardly, while the former is prevented from rotation. Fig. 11 shows in full lines the position which the hand lever and the hand wheels occupy when the cruising turbine is operative, while the dotted lines indicate the position which the said members occupy after the disengagement of the cruising turbine. It follows therefrom, that first of all the spindle 38 must be moved outwardly, i. e., the pinion 6 must be disengaged from the gear wheel 4, before the rod 39 can be moved to the left for releasing the spindle 37, and the valve 31 of the main turbine be opened. The device operates in the same manner in the converse case.

Fig. 12 shows a device for the automatic actuation of the appliance for engaging and disengaging the pinion. With the spindle 33ᵈ of the hand wheel 36, the rod 46 of a piston 47 is connected through the medium of a screw threaded member 45, said piston being movable within a cylinder 48 and owing to the guide 49 prevented from rotating. Into the outer chamber 50 of the cylinder 48, a steam pipe 51 from the cruising turbine opens, while the inner chamber 52 communicates with the main turbine through the medium of a pipe 53. As long as the cruising turbine operates the pressure of the steam acts on the outer side of the piston 47 which retains the pinion in engagement with the gear wheel. As soon as the cruising turbine is rendered idle owing to the shutting off of steam in the pipe 17 (Fig. 1) and steam enters the main turbine 1 through the valve 31, steam also enters the chamber 52, the consequence being that the piston disengages the pinion from the gear wheel automatically during its outward movement. The arrangement of the steam ingress is preferably provided in such a manner that the pinion is moved first and thereafter the steam turbine started at the time, is rendered operative. This effect may be attained by providing a separate port in the respective valves which is first opened whereafter the steam is allowed to reach the turbine. The member 45 permits, if it is found necessary, of the movement by hand of the pinion independently of the automatic displacing device.

The several constructions disclosed in the foregoing specification and represented in the drawing are merely examples of embodiments of my invention, as the latter may obviously be performed in different ways. I, therefore do not wish to be limited to the illustrated constructions, but what I claim as my invention, and desire to secure by Letters Patent, is—

1. In a steam turbine power plant for ships, the combination with main and cruising turbines interconnected by steam pipings, of a gear wheel connected to the main turbine, a pinion connected to the cruising turbine, means for engaging and disengaging the pinion with the gear wheel by moving it in a substantially radial direction, steam supplying valves for the turbines, and controlling means adapted to regulate the displacement of the pinion in interdependence with and in relation to the steam supply.

2. In a steam turbine power plant for ships, the combination with main and cruising turbines interconnected by steam pipings, of a gear wheel connected to the main turbine, a pinion connected to the cruising turbine, means for engaging and disengaging the pinion with the gear wheel by moving it in a substantially radial direction, steam supplying valves for the turbines, and means controlling the adjustment both of the pinion and the valve for the main turbine at the same time and in interdependence.

3. In a steam turbine power plant for ships, the combination with main and cruising turbines interconnected by steam pipings, of a gear wheel connected to the main turbine, a pinion connected to the cruising turbine, means for engaging and disengaging the pinion with the gear wheel by moving it in a substantially radial direction, steam supplying valves of the turbines, and means capable of blocking the valve of the main turbine and the device for displacing the pinion by a reciprocal interlocking.

In testimony whereof I have signed my name to this specification in the presence of two subscribing witnesses.

HERMANN FÖTTINGER.

Witnesses:
ERNST GRENNELS,
MARTA FRIESC.